Jan. 1, 1952  R. E. GRAHAM  2,580,672
SAW-TOOTH GENERATOR AND SYSTEM UTILIZING IT
Filed Nov. 14, 1947  5 Sheets-Sheet 1

INVENTOR
R. E. GRAHAM
BY
*Hugh S. Wentz*
ATTORNEY

Jan. 1, 1952   R. E. GRAHAM   2,580,672
SAW-TOOTH GENERATOR AND SYSTEM UTILIZING IT
Filed Nov. 14, 1947   5 Sheets-Sheet 2

INVENTOR
R. E. GRAHAM
BY
Hugh S. Wertz
ATTORNEY

Jan. 1, 1952  R. E. GRAHAM  2,580,672
SAW-TOOTH GENERATOR AND SYSTEM UTILIZING IT
Filed Nov. 14, 1947  5 Sheets-Sheet 3

INVENTOR
R. E. GRAHAM
BY
ATTORNEY

Jan. 1, 1952  R. E. GRAHAM  2,580,672
SAW-TOOTH GENERATOR AND SYSTEM UTILIZING IT
Filed Nov. 14, 1947  5 Sheets-Sheet 4
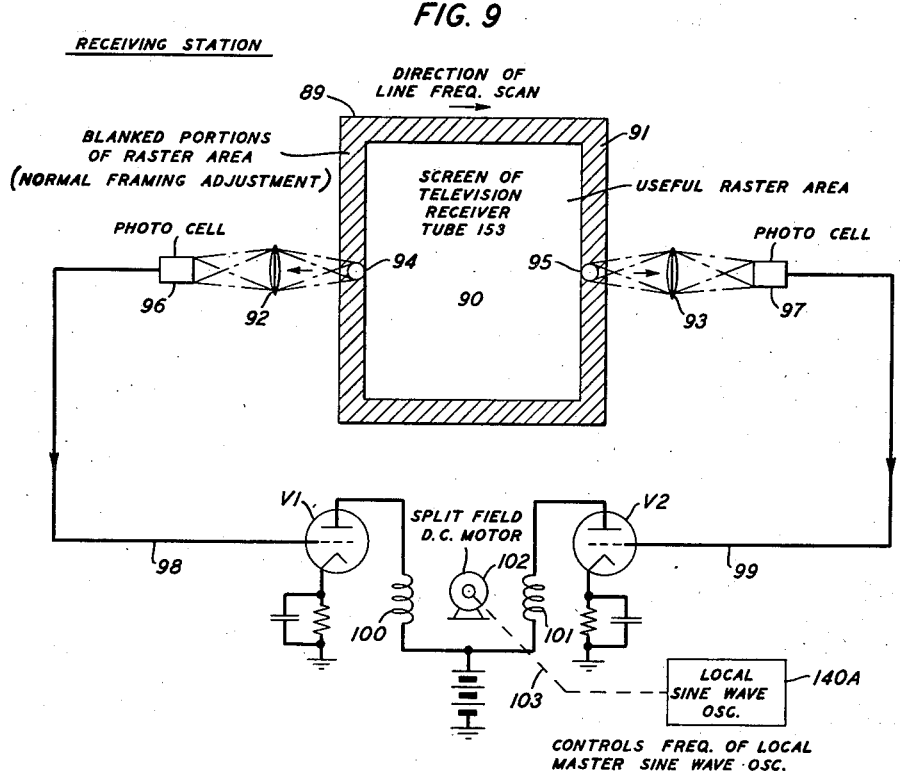
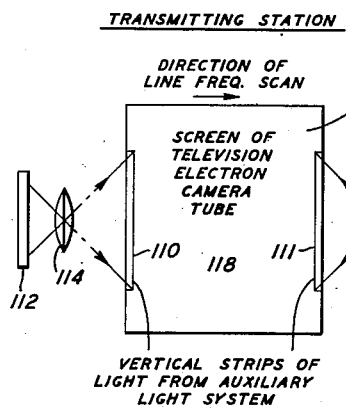
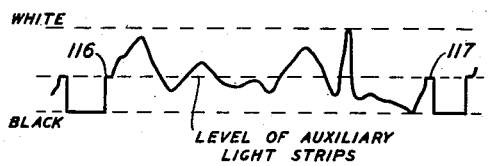
INVENTOR
R. E. GRAHAM
BY
ATTORNEY Jan. 1, 1952  R. E. GRAHAM  2,580,672
SAW-TOOTH GENERATOR AND SYSTEM UTILIZING IT
Filed Nov. 14, 1947  5 Sheets-Sheet 5
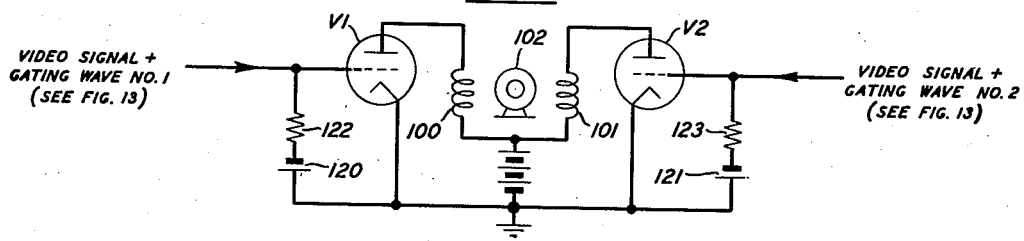
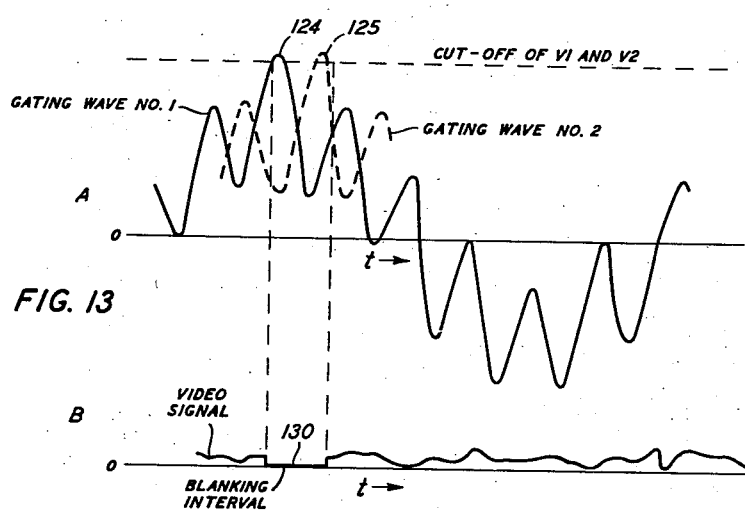
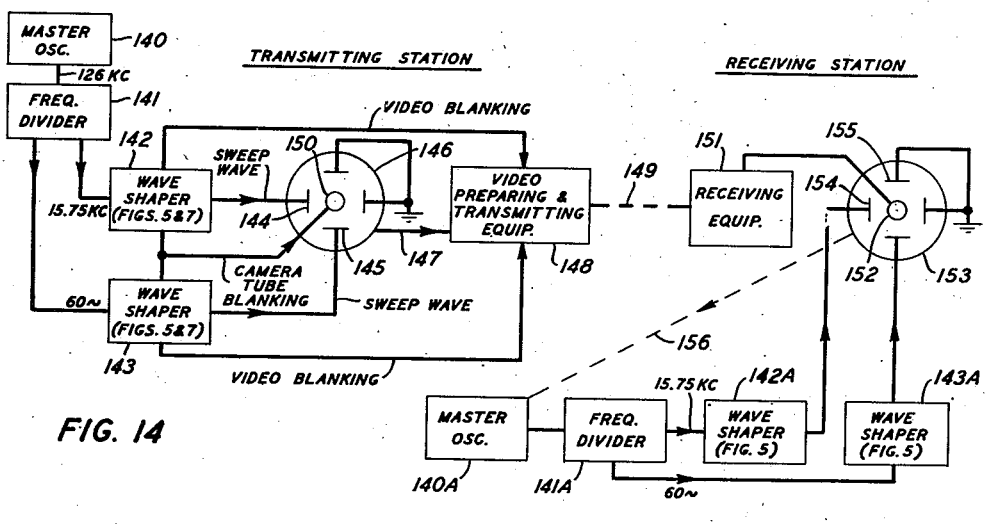
INVENTOR
R. E. GRAHAM
BY
ATTORNEY Patented Jan. 1, 1952

2,580,672

UNITED STATES PATENT OFFICE 2,580,672

SAW-TOOTH GENERATOR AND SYSTEM UTILIZING IT

Robert E. Graham, New York, N. Y., assignor to Bell Telephone Laboratories, Incorporated, New York, N. Y., a corporation of New York Application November 14, 1947, Serial No. 785,966

3 Claims. (Cl. 178—69.5)

This invention relates to television and more specifically to electronic television systems wherein the scanning voltages are produced by sine waves.

It is an object of this invention to utilize sine waves in the generation of scanning voltages.

It is another object of this invention to employ sine waves in the synchronization of electronic television systems.

The majority of present-day electronic television systems employ the start-stop system of scanning, wherein the scanning voltages are produced by saw-tooth oscillators, these oscillators being triggered by steep-sloped synchronizing pulses applied once per cycle of the saw-tooth wave. The synchronizing information in this type of system is transmitted in the form of a complex voltage pattern which requires the full video frequency channel for faithful reproduction. In order to transmit both synchronizing and video signals over the same channel, it is necessary for the channel to be divided into two amplitude regions, one for the picture signal, the other for the synchronizing signal. This appropriation of amplitude capacity of the system for synchronization requirements is specified by R. M. A. (Radio Manufacturers Association) standards to be of the order of 25 per cent, although as high as 40 or 50 per cent has been used in line transmission. The process of forming the synchronizing voltage pattern is a tedious one, requiring considerable numbers of multivibrators, limiters and mixers the function of which is to produce and interrelate numerous pulses of various periods and duration. The aggregate equipment required for a synchronization generator is considerable, including large numbers of vacuum tubes, and thus there are a number of maintenance problems presented. Systems employing the pulse method of synchronization are generally inflexible as regards changes in operating line or frame frequency. Multiple camera systems require expensive broad band coaxial cables to convey the synchronizing signal around to the various units. The problem of providing correct phase interrelations between the synchronizing signals fed to the different cameras requires additional lengths of this same cable for time delay. In general, the problem of amplifying and distributing the synchronizing signal is difficult due to its broad band characteristics. As a result of the broad frequency band characteristics of the synchronizing signal, it is impossible, once disturbing influences have found their way into the channel, to separate them out by frequency discrimination or other means. Any disturbance causing a displacement of the triggering results in a corresponding displacement error for the whole line in the case of the line sweep or the whole field in the case of the field sweep.

It is another object of this invention to utilize a system of synchronization which is free from many of the disadvantages of the arrangement described above and which compares favorably with the system using the R. M. A. signal in both the general broadcasting field and in the field of special television services.

These objects are attained in accordance with the invention by transmitting the synchronization signal in the form of one or two sine waves, the nucleus of the invention comprising the various means provided for transforming sine waves into saw-tooth waves. An illustrative embodiment of the invention utilizes a sine wave to saw-tooth wave converter comprising a straight wire cathode mounted concentrically with surrounding cylindrical electrodes, the assembly being immersed in a uniform magnetic field perpendicular to the axis of the cylinder. Electrons are emitted from the cathode and accelerated radially by positive electric fields set up by the surrounding electrodes. The action of the magnetic field is to concentrate these electrons into two thin radial sheets which lie parallel to the magnetic field. By rotating the magnetic field these electron sheets can be made to spin about the cylinder axis. A shield or masking anode is mounted within the tube in front of the anode, the shield having saw-tooth shaped apertures cut in it. By rotating the electron sheets, the amount of current reaching the signal anode can be made to vary according to the height of the apertures in the masking anode. By changing the shape of the apertures in the masking anode, the arrangement can be made to produce a saw-tooth wave or a saw-tooth wave plus other waves of signals or special wave shapes. Since only sine waves are transmitted and no synchronizing signals other than blanking information are transmitted to the receiver, it will be appreciated that considerable amplitude capacity is saved.

Speaking in general terms, it is clearly inadvisable to use a video band of frequencies to convey a quantity of information which can be exactly contained in one sinusoid. While there are certain distinctive advantages involved in the present R. M. A. synchronizing system, perhaps the most important of which is the simplicity of equipment required for deriving the synchronization of the sweep oscillators at the receiver, as contrasted with an excessive complication at the transmitter (which allocation of complication may be well suited to systems employed for general broadcasting, involving one transmitter and many receivers), however the economic factors may be very much different in the case of various kinds of point to point television services. Particularly in systems including extensive coaxial cable linkage, the aforementioned wastage of amplitude capacity might be very serious, necessitating a closer spacing of repeaters. It will be readily apparent, therefore, that the form of synchronization employed in the present invention has many advantages.

The invention will be more readily understood by referring to the following description taken in connection with the accompanying drawings forming a part thereof in which:

Fig. 9 illustrates a method of framing control operated from the picture produced on the receiving tube in a television system;

Fig. 10 shows an auxiliary optical system for the arrangement of Fig. 9;

Fig. 11 shows the resulting video signal from the arrangement of Fig. 9;

Fig. 12 illustrates a second arrangement for automatic framing;

Fig. 13 is a graphical representation to aid in the explanation of the arrangement of Fig. 12; and Fig. 14 is a block diagram of a television system utilizing a method of synchronizing in accordance with the invention.

Figure 1:
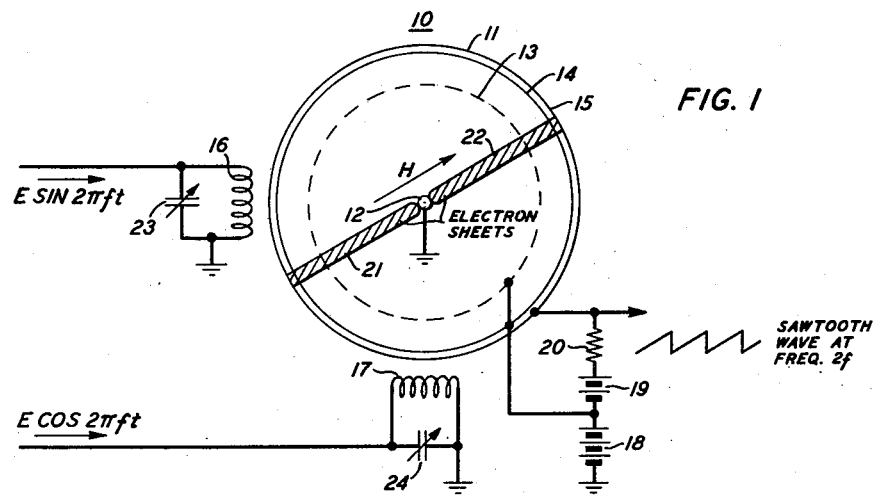
Fig. 1 is a schematic view of a sine wave to saw-tooth wave converter in accordance with the invention.

Referring more specifically to the drawings, Fig. 1 shows in schematic diagram form one form of sine wave to saw-tooth wave converter 10. The converter 10 comprises a tube 11 (shown in plan view in Fig. 1) and its associated circuit elements. The tube 11 employs principles which are set forth in Patent 2,217,774 issued October 15, 1940 to A. M. Skellett but the tube structure is specifically different from that disclosed in the Skellet patent. Tube 11 comprises a straight wire cathode 12 mounted concentrically with surrounding cylindrical electrodes 13, 14 and 15. The electrode 13 is a screening grid, the electrode 14 is a masking anode, which for example can be of the type shown in Figs. 2 and 3, and the electrode 15 is a signal anode. The electrode assembly 12 to 15, inclusive, is immersed in a uniform magnetic field perpendicular to the axis of the cylinder which is produced, for example, by magnet coils 16 and 17 arranged to produce uniform orthogonal fields perpendicular to the cylindrical axis. Electrons are emitted from the cathode 12 which, for example, is grounded, and accelerated radially by positive electric fields set up by the surrounding electrodes. By way of example, the electrodes 13 and 14 are placed at a potential of 150 volts positive with respect to ground by means of a source 18 and the electrode 15 is placed at a positive potential of about 75 volts with respect to the electrodes 13 and 14 by means of the source 19, a resistor 20 being included in circuit between the positive terminal of the source 19 and the electrode 15. The action of the magnetic field produced by the coils 16 and 17 is to concentrate the electrons from the cathode into two thin radial sheets 21 and 22 which lie parallel to the magnetic field. By rotating the magnetic field as, for example, by applying a sine wave ($E \sin 2\pi ft$) to the coil 16 and another sine wave ($E \cos 2\pi ft$) which, is of the same frequency as but which is displaced 90 degrees with respect to the wave applied to the coil 16, to the coil 17, these electron sheets 21 and 22 are made to spin about the cylinder axis. Thus the tube 11 provides an inertialess commutator. In addition, it furnishes very useable values of current in the electron sheets; for example, a typical model of this type of tube delivers 5 to 10 milliamperes at 150 volts anode potential. The thickness of the electron sheets in tubes of this type is of the order of 80 to 100 mils. The usual array of electrodes found in conventional vacuum tubes, that is, control grids, screen grids, suppressor grids, etc. can be included in the tube 11, if desired. The condensers 21 and 22 are connected in parallel to the coils 16 and 17, respectively, for proper phasing. While for simplicity in the drawings the envelope in which the electrode structure of the tube 11 is supported has not been shown, it is to be clearly understood that the electrode structure shown in Fig. 1 is contained within a proper evacuated envelope.

Figure 2:
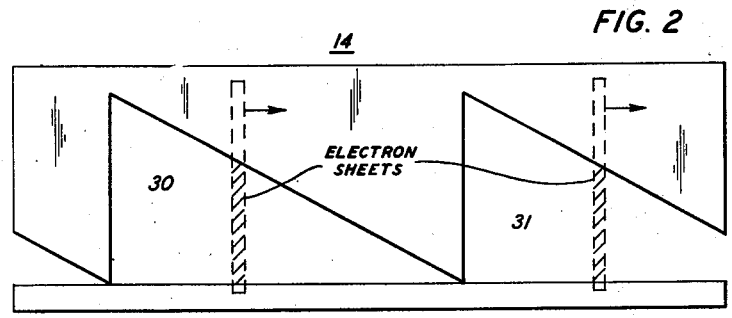
Fig. 2 shows a masking anode forming part of the converter of Fig. 1 when it is unrolled.

Fig. 2 illustrates the application of the magnetically focussed tube of Fig. 1 to the production of saw-tooth waves. This figure shows the masking anode 14 of the tube 11 in its rolled-out form, this anode being actually a cylinder as shown in Fig. 1. The masking anode 14 has saw-tooth shaped apertures 30 and 31 cut in it as indicated in Fig. 2. By rotating the electron sheets 21 and 22 in the arrangement of Fig. 1, the amount of current reaching the signal anode 15 can be made to vary according to the height of the apertures 30 and 31 in the masking anode 14. If the sheets 21 and 22 are made to revolve at a uniform speed such as by the application of the two sine waves indicated in Fig. 1, the signal anode current through the resistor 20 constitutes a linear saw-tooth wave having a fundamental frequency of twice the rotational frequency. By applying the signal anode current to the output resistor 20 which is, for example, of a few thousand ohms, sufficient voltage is developed to drive a final amplifier stage to deliver several hundred volts of sweep output. For the order of output current mentioned above for the tube of Fig. 1, a tube diameter of about 1½ inches is sufficient to minimize aperturing effects.

It will thus be seen that there is obtained a saw-tooth wave from a sinusoidal driving wave in such a way that the timing of the saw-tooth as a whole depends not upon the instantaneous value of the sine wave at some chosen point during the cycle but rather upon the average intensity of the sinusoidal shape over a full cycle. The importance of this is illustrated by the fact that an undesired irregularity in the source wave occurring for only a fraction of the cycle produces a corresponding sweep error only for the duration of the irregularity, the remaining portions of the cycle being unaffected. This is in sharp contrast to synchronization failures encountered with the triggering type of sweep mechanism wherein entire lines or fields are displaced. The importance of this difference is more clearly brought out by the fact that disturbances in synchronism are most visible to the eye when they occur in regions of high detail. For instance, jagged horizontal and vertical lines or borders are probably the worst offenders, while comparatively large synchronizing errors may go unnoticed in areas of uniform shading or slow gradations in tone. The sinusoidally controlled system takes a statistical advantage of this difference, since synchronizing disturbances exhibit their effects only for the portions of the picture at which they occur. The novelty of the sinusoidally controlled system of this invention might be further stated as a point-for-point correlation between the sine wave and the sawtooth wave; as against a single point-complete cycle correlation between synchronizing and sawtooth waves in present synchronizing systems.

In addition, since the source wave is a sinusoid, it can be transmitted over a channel having a very low signal-to-noise ratio and still be recovered with good fidelity through the use of sharply resonant filters. Also, the synchronizing wave can be quite effectively freed from noise by using it to control a local receiver oscillator have good frequency stability.

Figure 3:
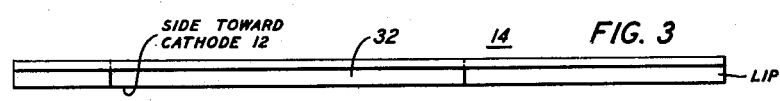
Fig. 3 is a plan view of the masking anode of Fig. 2 showing a raised guard fin or lip to prevent the transmission of certain secondary electrons.

An additional detail of the converter 10 is shown in Fig. 3. This is the raised guard fin or lip 32 placed around the edges of the apertures 30 and 31 in the mask 14 to prevent secondary electrons generated by the electron sheets 21 and 22 striking the cathode side of the mask 14 from reaching the signal anode 15. Moreover, the anode 15 is maintained at a potential somewhat higher than that of the mask 14 by means of the source 19 to prevent secondaries emitted from the anode 15 from reaching the mask 14. However, the secondary emission is made low due to the low accelerating voltages (order of 150 volts) and the use of low secondary emission material for the electrodes 13, 14 and 15.

Figure 4:
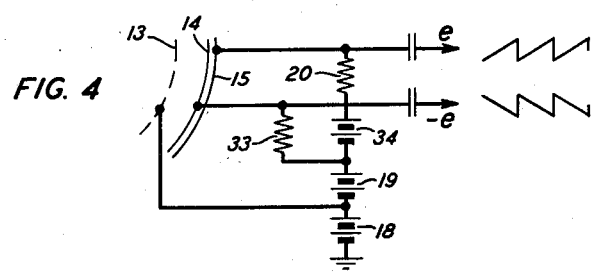
Fig. 4 shows an alternative output circuit arrangement for the converter of Fig. 1.

Instead of connecting the mask 14 to alternating current ground as shown in Fig. 1, this electrode can be used to provide an output sawtooth wave of opposite phase from that derived from the electrode 15. This arrangement is shown in Fig. 4. Referring now to this figure, it will be seen that the screening grid 13 is placed at a lower direct current potential than is the mask 14 due to the source 19, in this case to prevent secondaries emitted from the mask 14 from reaching the screening grid 13. The resistor 33 is connected in the circuit between the electrodes 13 and 14 in series with the source 19. In view of this arrangement, the balance of the output obtained from the mask 14 and the signal electrode 15 is inherently very good since this action is that of a space current dividing between the two electrodes. Thus the alternating current to the two electrodes 14 and 15 must be equal and opposite in sign. Hence, by making the two load impedances 20 and 33 equal and the two sources 19 and 34 equal, the output voltages are perfectly balanced. This has the advantage of eliminating a phase inverter stage in the sweep amplifier.

It should be noted that although the screening grid 13 is indicated in Fig. 1 by a dashed circle, it is probably advisable to make this element in the form of a spiral grid winding around the cylindrical axis, the support wires being placed at the flyback point of the saw-tooth apertures. This form is preferred to reduce serrations in the output signal due to the passage of electron sheets over grid wires. If this trouble still remains serious, the element 13 can be made up of straight wires parallel to the tube axis and arrayed in a circle to form a cylindrical structure. The pitch of these wires is adjusted so that the aperturing effect of the finite sheet thickness exactly nullifies any modulating action due to alternate wires and open spaces encountered in the rotation. The masking anode 14 can be made up with only one saw-tooth aperture (30 or 31) around the periphery with no change except for halving of the output amplitude.

Figure 5:
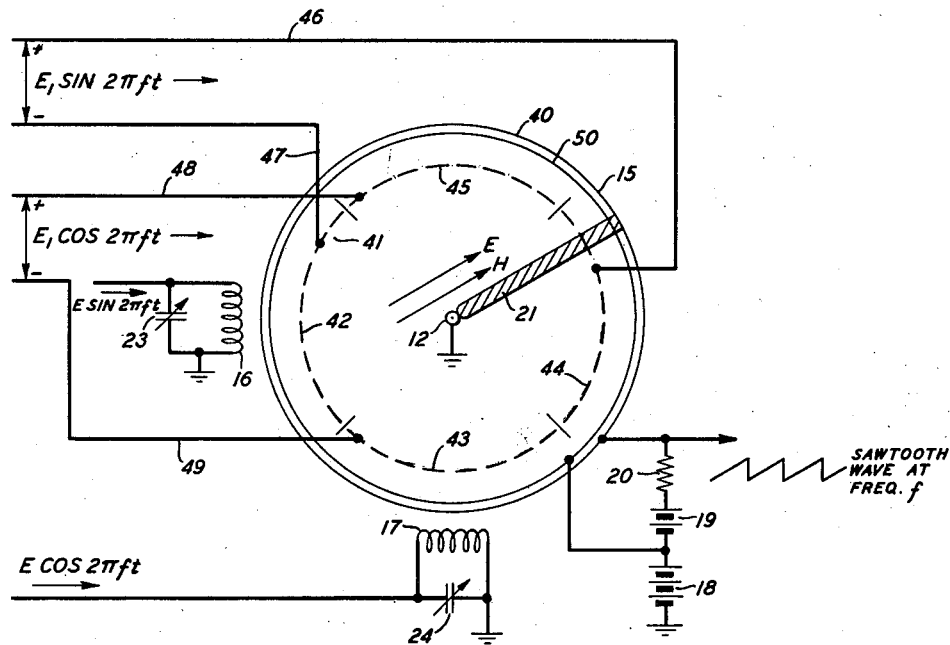
Fig. 5 is a schematic view of a modified sine wave to saw-tooth converter.

In the arrangement of Fig. 5, a rotating electric field is applied to the tube 40 (which is somewhat similar to the tube 11 of Fig. 1), in addition to the rotating magnetic field. This is done by dividing the grid 41 into four quadrants 42, 43, 44 and 45, respectively, and applying split phase sinusoidal voltages between the four sections as indicated in Fig. 5. By way of example, the sine wave $E_1 \sin 2\pi ft$ is applied by means of conductors 46 and 47 between the grid sections 44 and 41, while the sine wave $E_1 \cos 2\pi ft$ (a sine wave of the same frequency as, but 90 degrees phase displaced with respect to, the wave applied by means of the terminals 46 and 47) is applied by means of terminals 48 and 49 between the grid sections 45 and 43, respectively. The cathode 12 and the signal anode 15 are the same as in the arrangement of Fig. 1 but the masking anode 50 (shown in Fig. 6 in the unrolled position) has only a single saw-tooth aperture 51 cut around the periphery thereof. The magnetic coils 16 and 17 and the waves applied thereto are the same as in the arrangement of Fig. 1 as are the output terminals except for the fact that there is no external connection for the grid 41 except for the connections applying the two sine waves $E_1 \sin 2\pi ft$ and $E_1 \cos 2\pi ft$.

The arrangement of Fig. 5 operates to suppress one of the radial sheets; for example, the radial sheet 22 of the arrangement of Fig. 1 is suppressed. The output saw-tooth wave has the same frequency as the sinusoid applied to the magnetic coils instead of double this frequency as in the arrangement of Fig. 1. For a given thickness of electron sheet 21, this circuit arrangement permits a halving of the length of the saw-tooth aperture or a 2 to 1 reduction in minimum permissible tube diameter as compared with that required in the arrangement of Fig. 1. This permits a diameter of about three-quarters of an inch for the single electron sheet tube of Fig. 5 compared with the double sheet tube diameter of 1½ inches.

Figure 6:
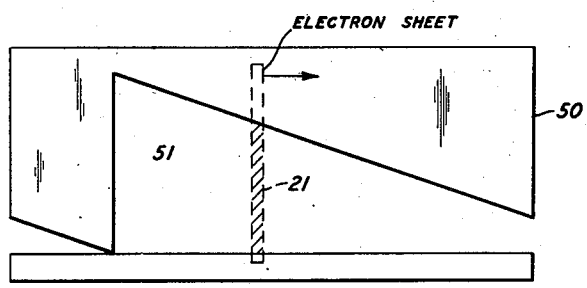
Fig. 6 is an elevation view of the mask used in the converter of Fig. 5 when it is unrolled.

In the arrangement of Fig. 6 and in that of Fig. 2 (and also in the masking electrodes of any of the arrangements to be later described) the saw-tooth apertures 30, 31 or 51 can be made to have other than linear shapes in order to compensate for curvature of amplifier tube characteristics, particularly those in the output tubes. This is quite important since it permits appreciably smaller output tubes to be employed.

these tubes being driven over a larger portion of their characteristics than is ordinarily feasible.

Figure 7:
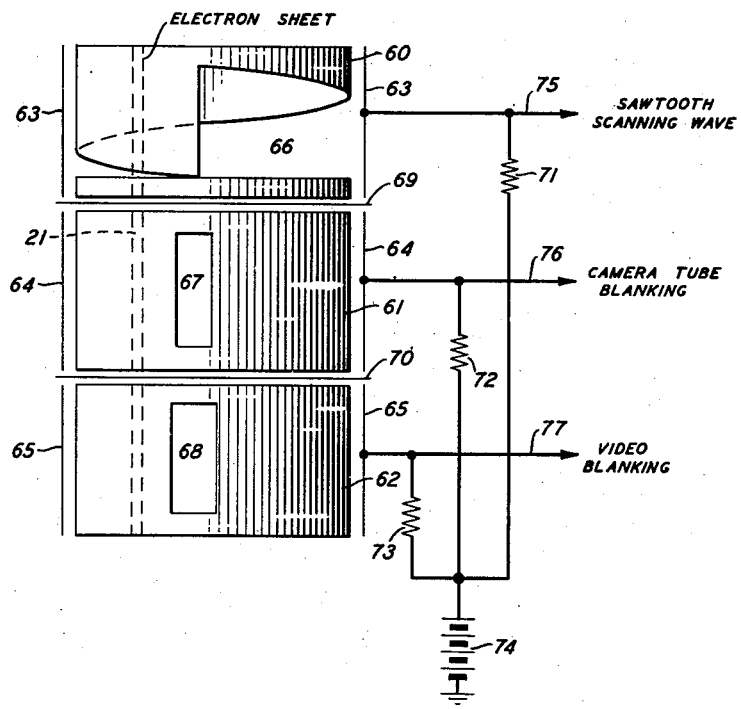
Fig. 7 is an elevation view of a cylindrical electrode structure for a converter of the general type of Fig. 5 including masks for producing, in addition to the saw-tooth scanning wave, pulses for camera tube blanking and for video blanking.
Figure 8:
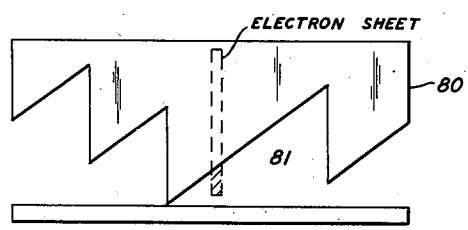
Fig. 8 shows in unrolled form a mask suitable for use in the converter of Fig. 5, the mask being suitable for producing the wave shape needed to scan film moving continuously at 24 frames per second with a 30-frame per second interlaced scan.

Figs. 7 and 8 show additional masking arrangements utilizing the tube shown in Fig. 5. Fig. 7 shows the cylindrical array of masking electrodes split into three segments located one above another and all utilizing the same rotating magnetic field and the same electron sheet for the purpose of developing the transmitter blanking pulses along with the scanning wave. In Fig. 7, three masking anodes 60, 61 and 62 are provided, one above the other. Associated with the mask 60 is the collector anode 63 which is in the same position with respect to the member 60 that the collecting anode 15 occupies with respect to the mask 14 in the arrangement of Fig. 1. Similarly, collecting electrodes 64 and 65 are provided in association with the masks 61 and 62, respectively. The mask 60 has a saw-tooth aperture 66 therein. The mask 61 has a rectangular aperture 67 therein while the mask 62 has another rectangular aperture 68 slightly wider than the aperture 67, it starting earlier and finishing later than the aperture 67 as far as the position of the moving electron sheet 21 is concerned. Between the masks 60 and 61 is a shielding member 69 while between the masks 61 and 62 is a similar shielding member 70. The collecting electrode 63 is connected through a resistor 71 to the positive terminal of a source 74 of direct potential while the collectors 64 and 65 are connected to this same terminal through resistors 72 and 73, respectively. The other terminal of source 74 is connected to ground. Between the output terminal 75 and ground is produced a saw-tooth scanning wave, between the terminal 76 and ground is produced a wave or signal utilized for camera tube blanking while between the terminal 77 and ground is produced a signal for video blanking. A convenient feature of the arrangement shown in Fig. 7 is that the relative timing and duration of the flyback of the sweep wave, the video blanking and the camera tube blanking are determined simply by the space arrangements of the masks 60, 61 and 62. The width of the blanking slits 67 and 68 has been shown greater than that of the sheet 21 so that the slit width determines the pulse duration, and the sheet width the time of rise and fall. This may be reversed at the expense of lessened output by making the slits narrow compared to the sheet width.

A mask 80 to produce another type wave shape is shown in Fig. 8. Mask 80 is adapted to be used with the tube of Fig. 5 and has an aperture 81 therein of the peculiar wave shape needed to scan film moving continuously at 24 frames per second with a 30 frame per second interlaced scan. By inserting the anode mask 80 in the converter tube of Fig. 5 (instead of the mask 53 shown therein) and by applying 12 cycles per second sine waves to the magnet coils and to the sections of the grids, the required scanning wave is produced. The shape of the output wave is that of the opening 81 in the mask 80 and it can be seen that it is the wave shape needed to scan adjacent frames of the film with two and three field scans respectively. Such a wave is shown in Fig. 6 of Patent 2,291,723 issued August 4, 1942 to A. G. Jensen.

In any of the variations which have been described above, the necessary predistorted waves for achieving linear magnetic deflection can be obtained by shaping the anode mask accordingly. In general, any desired shape of sweeping wave can be obtained by introducing that shape into the aperture of the anode mask.

Having described various means in which a sine wave is utilized to produce various sweep wave shapes and to produce other signals, systems in which these converters are used will now be considered. As an introduction to one system arrangement, a hypothetical 525-line interlaced television system in which no synchronizing information is transmitted to the receiver will be considered. In this system, the scanning voltages at either transmitter or receiver are to be derived (by way of the previously described sweep converters of Fig. 1 or Fig. 5) from local sine wave oscillators of good frequency stability, both transmitter and receiver oscillators being adjusted to be as nearly equal in frequency as their stability will permit. Starting from a condition where the receiving raster is preferably framed with the transmitter raster, and assuming a small frequency error between the transmitter and receiver oscillator, the only appreciable effect of this error will be a slow drift in horizontal framing of the received picture. Crystal oscillators are known in which such a drift is very slow indeed. For example, a temperature-controlled bridge stabilized crystal oscillator has been known to hold a frequency constant within less than one part in $10^9$ parts over considerable lengths of time. With two such oscillators accurately adjusted together, assuming the maximum departure in frequency between them to be permanently in effect, the received picture drifts in horizontal framing at a rate of less than one-half element per minute. At this rate it takes an 8-inch 525-line picture about one-half hour to drift out of frame by two per cent of its width or one-sixth of an inch. Thus by imposing upon the observer the trifling task of adjusting a phase shifter, say once in two hours, the synchronizing problem is eliminated.

Actually the situation is even somewhat better than this since the principal variation in frequency of this type of oscillator follows a sinusoidal cycle caused by the cyclical operation of the thermal regulator. The period of this cycle is of the order of a few minutes so that the situation assumed above, where the maximum frequency difference between the two oscillators is maintained for considerable lengths of time, is not encountered. Actually the integrated framing drift over one of these frequency variation cycles is apt to be extremely small, the effect of the half-cycle when the frequency is above the mean value being cancelled by the half-cycle when it is below the mean value. Thus the framing drift is frequently not perceptible over a full day's operation. The quality of oscillator desired to maintain this high stability level approaches the best it is possible to obtain. However, this method of synchronization can be employed with oscillators having much poorer frequency stability. From considerations of detectable rate of movement and loss of resolution, it is estimated that a frequency stability of one part in $3 \times 10^6$ is the minimum permissible with intermittent manual framing correction. This gives a 2 per cent framing drift in about five seconds and this can be corrected about every twenty seconds.

With still lower values of frequency stability, the application of this synchronizing method requires some kind of automatic framing device. Actually such a device can be used in any of the systems discussed above. For a degree of frequency stability which permits intermittent manual framing adjustment at intervals of a few seconds or more, providing for an automatic training control is not a very difficult problem. Some systems which make use of the blanking information transmitted along with the video signal will now be described.

The first of such systems providing automatic framing control is shown in Fig. 9 and operates from the picture produced on the receiving tube. Before describing the arrangement of Fig. 9, however, reference is made to Fig. 14 which is a block diagram of both transmitting and receiving stations of a television system. In Fig. 14, the master oscillator 140 at the transmitter station produces sine wave oscillations having a frequency of 126 kilocycles, for example, which are transformed in frequency in the frequency divider 141 into two sine waves of 15.75 kilocycles and 60 cycles, respectively, (the proper frequencies for line and field scanning, respectively, in a 525-line interlaced television system). These two sine waves are applied to the wave shapers 142 and 143, respectively which are, for example, of the type shown in Fig. 5. (If shapers of the type shown in Fig. 1 are used, the input frequencies to the shapers will be one-half those given above.) The saw-tooth output waves of the shapers 142 and 143 are applied to the horizontal deflecting plates 144 and the vertical deflecting plates 145, respectively, of the electron camera tube 146 to control the sweeping of the beam therein. The output signal of the camera tube is applied by means of the connection 147 to equipment represented in the drawing by the box 148 designated "Video Preparing and Transmitting Equipment." Here the video signal is combined with blanking signals (which may be generated in the wave shapers 142 and 143 if the shapers have masks of the general type shown in Fig. 7) and suitably modulated, if required, with a carrier for transmission to the receiving station over a wire or radio or other channel 149. If the masks in the shapers are of the type (as in Fig. 7) to produce camera tube blanking, connections are made to the modulating element 150 in the camera tube 146. At the receiving station, the received signal is demodulated and amplified, if required, in the receiving equipment 151 and the resultant video signal is applied to the control element 152 of the cathode ray receiver tube 153. Applied to the horizontal sweep plates 154 is a saw-tooth wave generated by wave shaper 142A (which is similar to wave shaper 142 at the transmitter station except that the mask used in the shaper need produce only the sweep wave). Similarly, a saw-tooth wave generated by the shaper 143A (which except for the fact that no camera tube blanking or video blanking is required is similar to the shaper 143) is applied to the vertical deflecting plates 155. The master oscillator 140A and the frequency divider 141A providing the 15.75-kilocycle and 60-cycle waves for driving the members 142A and 143A are similar, respectively, to the oscillator 140 and the frequency divider 141 at the transmitter station. The dashed line 156 between the cathode ray tube 153 and the oscillator 140A is intended to indicate the control of the latter from the former in a way which will now be described; it should be understood however that the dashed line 156 is not a mechanical connection as the control means includes the equipment of Fig. 9 outside the tube.

Referring now to Fig. 9, the scanning raster 89 of the receiver tube 153 is shown as it would appear with a video signal modulating the receiving tube with proper picture framing. The sectioned areas 91 are those parts of the raster which are blanked due to the video blanking, the inner rectangle 90 being the active picture area. The lenses 92 and 93 are so arranged that they cover two small areas 94 and 95, respectively, adjacent to the active picture area 90 as shown in Fig. 9. The light picked up by these lenses is projected upon photocells 96 and 97, respectively, and their outputs are fed by means of connections 98 and 99, respectively, to the grids of tubes V1 and V2, respectively. These tubes feed separate halves 100 and 101 of the field coil of the motor 102 in such a way that an unbalance between the V1 and V2 outputs is required to drive the motor 102, the direction of rotation depending upon the polarity of unbalance. This motor is geared by any suitable means, represented by the dashed line 103, to control the frequency of the local master oscillator 140A (such as, for example, by varying the capacity of a small condenser in series with a crystal in the oscillator). Any high grade crystal-controlled oscillator can be used. With normal framing, there is no light picked up by either lens 92 or 93 and thus there is no unbalance between the field coils 100 and 101. However, any drift in frequency between the transmitter and receiver master oscillators 140 and 140A causes the active picture area 90 to drift into the field of one or the other of the lenses 92 or 93, depending on the direction of the frequency drift. Since the other lens will still be covering a blanked region, there is produced an unbalance in the output of the two tube circuits which causes the frequency control motor 102 to correct the frequency of the local oscillator 140A. This, of course, suppresses the framing drift. It should be noted that the automatic framing control will compensate for slow drift in the delay characteristics of the transmission path between the two stations as well as for drift in the frequency of the oscillator from standard frequency.

As an alternative to regulating the frequency of the sine wave oscillator 140A, the control motor 102 can be geared to 15.75 kilocycle and 60-cycle phase shifters which control the phases of the receiver sweep voltages.

While the arrangement shown in Fig. 9 is generally satisfactory, it has one disadvantage. Due to possible black areas in the picture which may appear at the edges in such a way that they erase the black-to-white contour necessary for the circuit operation, incorrect framing may be produced. This can be remedied at the transmitter by forming two narrow vertical strips of light 110 and 111 on the photocathode 118 of the camera tube 146 as shown in Fig. 10. The light strips 110 and 111 are produced by light from an auxiliary light system comprising sources 112 and 113 and lenses 114 and 115, respectively. It is obvious that the sources 112 and 113 can be combined into a single source, if desired. These strips of light 110 and 111, which must be shielded from the picture light applied to the photocathode 112 of the camera tube, insure the necessary contour. The strips can be made as narrow as one or two per cent of the picture width in order to minimize wastage of useful picture area. The resulting video signal from one line of the photocathode 112 when it is scanned in the direction of the arrow is shown in Fig. 11. It will be noted that the level of the auxiliary light strips 110 and 111 is intermediate the black and white levels, these strips producing narrow shoulders 116 and 117 at the beginning and end of the picture signal for the line. These shoulders 116 and 117 can be produced by electrical means (such as one of the wave shapers described above using an auxiliary mask) and introduced by electrical means into the signal (in the same manner as blanking signals are introduced), instead of by the optical means shown in Fig. 10.

A second device for automatic framing is shown in Fig. 12. In this arrangement, the two tubes V1 and V2 are arranged to drive the split field motor 102 as before. The tubes V1 and V2 are biased by any suitable means, such as batteries 120 and 121, respectively, which are connected in series with resistors 122 and 123, respectively. By this means, both V1 and V2 are cut off in the absence of signals applied to their grids. The input signals for the two grids consist of the video signal, Fig. 13B, plus superposed gating waves, Fig. 13A. Gating wave No. 1 for V1 is obtained by combining a 126 kilocycle sine wave from the local master oscillator with a subharmonically produced 15.75 kilocycle sinusoid. Gating wave No. 2 for V2 is obtained by a similar combination of sine waves, suitably displaced in phase. As indicated, the combinations of sine waves form peaks 124 and 125 each of which swings its associated tube to the conducting point once per cycle of the 15.75 kilocycle wave. For normal framing, the V1 gating wave (No. 1) is so phased that the positive extremity 124 occurs just after the beginning of the video line blanking interval 130. The V2 gating wave (No. 2) is shifted slightly in phase so that the maximum positive swing occurs just before the end of the video line blanking. Under the condition of proper framing, V1 and V2 are driven equally positive by the peaks 124 and 125 (hence they have the same average current) and there will be no rotation of the motor 102. If a frequency drift of the two master oscillators 140 and 140A occurs, the relative phase of the video signal and the gating waves will be changed. This results in one of the tubes V1 or V2 conducting more during its positive swing than the other. This unbalance in the tube output causes the motor 102 to correct the frequency drift. The vertical strips of light 110 and 111 of the arrangement shown in Fig. 10 are also required for this arrangement. If desired, the motor 102 can actuate phase shifters instead of a frequency control, at least when the maximum phase departure is small.

It is obvious that a system having master sine wave oscillators at the transmitter and receiving stations from which saw tooth waves and other signals are derived by means of one of the converters shown in Figs. 1 and 5 taken in conjunction with one of the methods of producing framing control illustrated by Figs. 9 and 12 results in a synchronizing system which has many advantages over the type of synchronizing employed in the present system approved by R. M. A. standards, which advantages are set forth above.

It is clear that various changes can be made in the embodiments described above without departing from the spirit of the invention, the scope of which is indicated in the appended claims.

What is claimed is:

1. A television system including transmitting and receiving stations and a transmitting path between them, a master sine wave oscillator at each of said stations, a cathode ray tube at each station, means comprising a rotating electron beam tube at each station for deriving from sine waves produced by the oscillator at that station saw-tooth waves for controlling the scanning of the cathode ray tube thereat, and means for phase-locking said oscillators.

2. A television system including transmitting and receiving stations and a transmitting path between them, a master sine wave oscillator at each of said stations, a cathode ray tube at each station, means comprising a rotating electron beam tube at each station for deriving from sine waves produced by the oscillator at that station saw-tooth waves for controlling the scanning of the cathode ray tube thereat, and means for phase-locking said oscillators, said last-mentioned means including means for picking up light from opposite border areas of the scanned area on the receiver tube and for utilizing said reflected light to differentially control the frequency at the receiving station.

3. A television system including transmitting and receiving stations and a transmitting path between them, a master sine wave oscillator at each of said stations, a cathode ray tube at each station, means comprising a rotating electron beam tube at each station for deriving from sine waves produced by the oscillator at that station saw-tooth waves for controlling the scanning of the cathode ray tube thereat, and means for phase-locking said oscillators, said last-mentioned means comprising means for utilizing sine waves from the receiver oscillator to form two spaced peaks or pulses, one immediately following the completion of a line scanning and one immediately preceding the start of the next line scanning, and utilizing said pair of peaks to differentially control the frequency at the receiving station.

ROBERT E. GRAHAM.

REFERENCES CITED

The following references are of record in the file of this patent:

UNITED STATES PATENTS

| Number | Name | Date |
|---|---|---|
| 2,217,774 | Skellett | Oct. 15, 1940 |
| 2,258,943 | Bedford | Oct. 14, 1941 |
| 2,391,967 | Hecht | Jan. 1, 1946 |

FOREIGN PATENTS

| Number | Country | Date |
|---|---|---|
| 468,505 | Great Britain | July 6, 1937 |